Patented Dec. 28, 1943

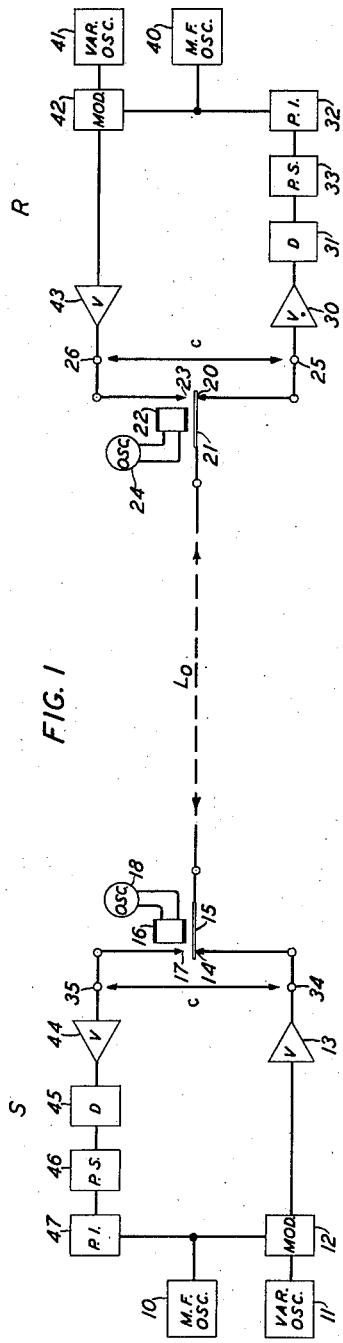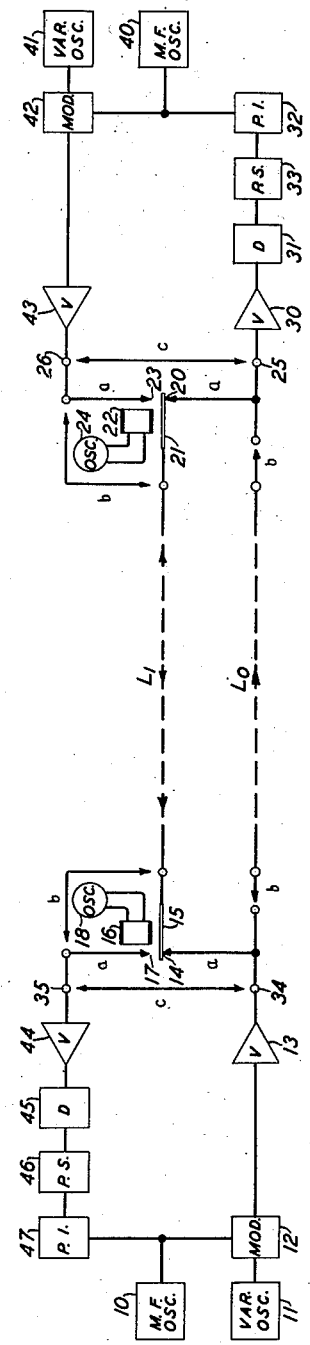

2,337,540

UNITED STATES PATENT OFFICE 2,337,540

MEASUREMENT OF ENVELOPE DELAY OF ELECTRIC CIRCUITS

Montague S. Burgess, Queens Village, N. Y., assignor to Bell Telephone Laboratories, Incorporated, New York, N. Y., a corporation of New York Application February 1, 1941, Serial No. 376,976

6 Claims. (Cl. 179—175.3)

This invention relates to measuring systems and more specifically to methods of measuring envelope delay of transmission lines.

It is an object of this invention to provide novel methods for measuring the envelope delay of electric circuits, and particularly of a transmission line.

Envelope delay is by definition the slope of a phase vs. frequency curve

The quantity
$$\left(\frac{d\beta}{d\omega}\right)$$
$$\frac{d\beta}{d\omega}$$

can be expressed by the following equation:

$$\frac{d\beta}{d\omega} = T + \omega\frac{dT}{d\omega} \qquad (1)$$

where T is the phase delay $$\left(\frac{\beta}{\omega}\right)$$

From the standpoint of telephotography and television the transient nature of the phenomena involved is such that all of this equation must be considered. Only when certain parts of the frequency range are required and it is known that T differs by some small quantity from the envelope delay which is within the accuracy desired should phase delay be used to replace envelope delay. In actual measurements $$\frac{d\beta}{d\omega}$$

is not actually accomplished, the quantity measured being $$\frac{\Delta\beta}{\Delta\omega}$$

which is sufficiently accurate for practical purposes. This measured quantity may be thought of as the true value of $$\frac{d\beta}{d\omega}$$

at a frequency differing from the carrier or measuring frequency by an amount equal to the modulating frequency.

$$\frac{\Delta\beta}{\Delta\omega}$$

is obtained in the present invention by fixing the frequency difference and measuring the corresponding phase change. Reference is made to a paper entitled "Measurement of Phase Distortion" by Messrs. Nyquist and Brand published in the Bell System Technical Journal, July 1930, volume IX, commencing on page 522, which deals with the measurement of phase distortion or delay distortion and is particularly concerned with measurements in telephone circuits. For this purpose use is made of the above-mentioned quantity "envelope delay" which is defined therein as the first derivative of the phase shift with respect to frequency.

The present invention relates particularly to methods of measuring envelope delay of a straightaway television circuit employing a reversible line, that is, a line which is capable of transmitting waves in either direction. In accordance with the invention, a modulated wave formed by modulating a wave from a variable oscillator (the frequency of which for convenience of description will be hereinafter designated the "measuring" frequency and which frequency is constant during a given set of readings taken to provide data for determining the envelope delay at that particular value of frequency but which is adapted to be varied to obtain the envelope delay at other frequencies) with a wave of a low fixed frequency (hereinafter being frequently designated the fixed or "modulating" frequency) is sent over the circuit and detected at the receiving end and compared in phase with an unmodulated wave of the modulating frequency generated by an oscillator of that frequency located at the receiving end. A second modulated wave is formed at the receiving end by modulating a wave from a variable oscillator supplying the measuring frequency with a wave of modulating frequency and sent to the sending end over the circuit and there detected to form a demodulated wave of the modulating frequency which is compared in phase with an unmodulated wave of the modulating frequency from an oscillator of waves of that frequency at the sending station. The envelope delay of the circuit is determined from the two phase comparisons and from readings obtained in calibration.

In a modification, the reversible circuit may be an auxiliary line in the case where the circuit to be measured is not reversible. In this arrangement the delay of the reversible line is measured and then transmission is effected through both lines in series.

The invention will be more readily understood by referring to the following description taken in connection with the accompanying drawing forming a part thereof in which:

Fig. 1 shows a system for measuring envelope delay in a straightaway television circuit employing a reversible line; and Fig. 2 shows a modification of the system of Fig. 1.

Referring more particularly to the drawing, Fig. 1 shows an arrangement for measuring the envelope delay of a reversible circuit Lo. The system of Fig. 1 makes use of similar apparatus at each end of the straightaway circuit Lo and an important feature of the arrangement of Fig. 1 is that measurements are independent of the phase relation between the modulating frequency oscillators, one at the sending end and one at the receiving end. The equipment at each end of the line can be calibrated independently.

Referring now to the sending end apparatus generally designated by the reference character S, there is provided an oscillator 10, designated the modulating or fixed frequency oscillator, which generates a sine wave of a fixed frequency as, for example, 5,000 or 10,000 cycles. This frequency is designated the fixed or modulating frequency. There is also provided an oscillator 11 which is designated the variable or measuring frequency oscillator and which generates sine waves for testing purposes of from, for example, 50 kilocycles to 1 to 2 megacycles. Any well-known oscillators may be used as the members 10 or 11. The outputs of these oscillators are fed into a modulator 12 and a modulated wave is obtained which comprises the measuring frequency from the oscillator 11 modulated by the low fixed frequency (the modulating frequency) from the oscillator 10. This modulated wave is amplified by the variable amplifier 13 (that is an amplifier which can amplify a wide band of frequencies) and then transmitted over the line Lo to the receiving end station R over the lower contact 14 and the armature 15 of the relay 16 and the lower contact 20 and the armature 21 of the relay 22.

At the receiving end station generally designated by the reference character R, the modulated wave is amplified by the variable amplifier 30 and this amplified wave is then conducted to a detector 31 of any suitable form where the envelope is detected in the usual way and the resulting modulating frequency wave is compared with the phase of a wave from a local modulating frequency oscillator 40, any suitable phase indicating or comparing device 32 being used for comparison purposes. The phase shifting device 33 is connected in circuit with the phase indicator 32 for a purpose which will be hereinafter described. The phase indicating device 32 may be of the dynamometer type, such as is disclosed in Patent 1,645,618, issued October 18, 1927, to Nyquist or it may be of the cathode ray oscillograph type wherein two waves of the same frequency and shape but differing in phase one from the other are applied to the respective pairs of deflecting elements thereof. The comparison is made by operating a phase shifting device, such as the device 33, until a recognizable and predetermined pattern is seen on the screen of the oscillograph, such as, for example, an ellipse or a straight line.

Also at the receiving station R is a variable oscillator 41 which generates oscillations of the same frequency (for a particular reading) as the oscillator 11 at the sending station S and a modulator 42 which is comparable to the modulator 12 at the sending end. The modulator 42 produces a modulated wave which comprises the measuring frequency from the oscillator 41 modulated by the low fixed frequency from the oscillator 40. The frequency of the wave from the oscillator 40 is equal to that of the wave from the oscillator 10. This modulated wave is amplified by the variable amplifier 43 and conducted by means of the upper contact 23 and the armature 21 of the relay 22 (it being operated to this position at this time by means of potential applied to the relay 22 from an oscillator 24 operating, by way of example, at from 10 to 20 cycles per second) to the line Lo. This modulated wave is then conducted over the reversible line Lo and the armature 15 and upper contact 17 of the relay 16 the coil of which receives current waves from an oscillator 18. The wave is then applied to a variable amplifier 44 and then detected by the detector 45 to form a demodulated wave of the modulating frequency which is conducted through a phase shifting arrangement 46 to the phase indicator 47 which may be similar to the phase indicating arrangement 32 at the receiving end station R.

The manner in which the arrangement shown in Fig. 1 may be used to measure the envelope delay of the reversible transmission line Lo will now be explained. A modulated wave, as described above, is sent through the lower branch of the apparatus, that is, through contact 14 and armature 15 of relay 16, Lo, and armature 21 and lower contact 20 of the relay 22 to the lower bank of the receiving apparatus R, when the line relays 16 and 22 are in the position shown in Fig. 1 of the drawing. This modulated wave is detected in the usual way by detector 31 and the resulting modulating frequency wave is then compared by the phase indicating device 32 with the phase of the modulating frequency oscillator 40 at the receiving end having the same frequency setting. This comparison may be made by adjusting the phase shifter 33 until the desired indication is given on the phase indicating device which, for purposes of example, will be considered to be a cathode ray oscillograph. When such a comparison is made of two waves having the same frequency but different phase relation, the resulting diagram on the oscillograph screen is an ellipse, considering that the detected wave is applied to one set of deflecting plates or to one set of magnetic deflecting coils and the wave from the modulating frequency oscillator 40 is applied to the other set of plates or coils, that is, to the set which causes the deflection which is substantially at right angles to that caused by the other set of deflecting elements. When the two waves are in phase, this ellipse reduces to a straight line running diagonally across the screen. This reading obtained by the phase shifter 33 will indicate the delay caused by the sending and receiving apparatus at the lower branch, the line Lo, and the difference in phase of the sending and receiving end modulating frequency oscillators, that is, the difference in phase of the output of the oscillators 10 and 40. Let it be assumed that this difference is such that it adds a corresponding delay to the other delays measured. Now when the relays 16 and 22 are operated in the upper position, a modulated wave from the receiving end R formed by modulating together the output of the oscillators 40 and 41, is sent through the upper branch of the apparatus over the circuit comprising the upper contact 23 and the armature 21 of the relay 22, the line Lo, the armature 15 and upper contact 17 of the relay 16 and the upper branch of the apparatus at the sending end S where it is detected by the detector 45 and the resulting demodulated wave of modulating frequency applied through the phase shifting device 46 to the phase indicating device 47 which is preferably similar to the corresponding device 32 at the receiving end R. At the phase indicating device 47, an unmodulated wave from the oscillator 10 and the detected wave are compared as in the similar situation at the receiving end, but the total delay measured by the phase shifting device 46 is greater than desired by the amount corresponding to the delay caused by the phase difference of the two modulating frequency oscillators 10 and 40. When these oscillators are reasonably stable and the line relays 16 and 22 operate at some low frequency by current from the oscillators 18 and 24, sufficient stability of phase relations will exist for practical measurements. The measurement is also not dependent on exact synchronism of the two relays 16 and 22 for all practical purposes.

In order to see the final result obtained, let $M_1$ and $D_1$ denote the delay caused by the lower and upper branches of the sending apparatus at the station S and $D_2$ and $M_2$ the delay caused by the lower and upper branches of the receiving end apparatus at the station R, respectively. The symbols D and M are associated with apparatus relating to the detector and modulator, respectively. Let $R_1$ equal the reading of the phase shifter 33 for measurement of the lower branch including the circuit $L_0$ and let K denote the difference in delay between the sending end and receiving end modulating frequency oscillator waves, that is, the difference in phase between the modulating frequency oscillators 10 and 40. Then the reading for the lower branch is $$M_1 + L_0 + D_2 + K = R_1 \quad (2)$$

For the upper branch, the delay is $$M_2 + L_0 + D_1 - K = R_2 \quad (3)$$

Solving these equations for $L_0$ gives $$L_0 = \frac{R_1 + R_2 - [(M_1 + D_1) + (M_2 + D_2)]}{2} \quad (4)$$

The apparatus at each end is very easily calibrated by connecting the calibration strap c between the two amplifiers 13 and 44 at the points 34 and 35 at the sending end and a similar strap c between the points 25 and 26 at the receiving end, sending the modulated wave around the loop thus formed at each end and noting the phase shifter readings on the devices 33 and 46. The results are given by the following equations, where $C_1$ and $C_2$ are phase shifter readings of the sending and receiving ends S and R, respectively:

$$C_1 = M_1 + D_1 \quad (5)$$
$$C_2 = M_2 + D_2$$

Substituting these calibration values in Equation 4 gives $$L_0 = \frac{R_1 + R_2 - (C_1 + C_2)}{2} \quad (6)$$

This gives a measure of the envelope delay (generally expressed in seconds, but depending upon the manner in which the phase shifting devices 33 and 35 are calibrated) for any frequency of the variable oscillators 11 and 41. Additional readings are taken at other values of frequency to determine the frequency-envelope delay characteristic of the circuit or apparatus.

In the situation where the circuit $L_0$ to be measured is not reversible but in which an auxiliary reversible circuit, which need not be capable of transmitting high frequencies, is available, the circuit arrangement shown in Fig. 2 is suitable. In Fig. 2 the apparatus at the receiving end and the sending end stations is respectively similar to the corresponding apparatus at these stations in the arrangement of Fig. 1 and like elements have been given the same reference characters in the two figures. The line $L_0$ to be measured is, however, not reversible in Fig. 2 but the auxiliary line $L_1$ is reversible.

After making the connections indicated by the reference character a, an envelope delay measurement of the reversible auxiliary line $L_1$ is obtained as outlined above in connection with the circuit of Fig. 1. On disconnecting the contact connections a and making the connections indicated by the reference character b, the circuit $L_0$ transmits in a direction shown by the arrow, that is, from the sending station S to the receiving station R. $L_1$ is then only used to transmit in the reverse direction to $L_0$, that is, the line $L_1$ is used to transmit only from the receiving station R to the sending station S. With the connections a in place, the delay of $L_1$ is given by Equation 6, it being substituted for $L_0$ in Fig. 1. When connections b are used, the delay of the lower and upper branches are given, respectively, as $$M_1 + L_0 + D_2 + K = R_3 \quad (7)$$
$$M_2 + L_1 + D_1 - K = R_2 \quad (8)$$

Solving these two equations, $$L_1 + L_0 = R_2 + R_3 - [(M_1 + D_1) + (M_2 + D_2)]$$

Rearranging and substituting for C gives $$L_0 = R_2 + R_3 - (C_1 + C_2) - L_1 \quad (9)$$

Substituting the value of $L_1$ as given by Equation 6, the expression for the envelope delay, generally expressed in seconds, of the circuit $L_0$ becomes $$L_0 = R_3 + \frac{R_2 - R_1}{2} - \frac{C_1 + C_2}{2} \quad (10)$$

When connections a are used involving only the circuit $L_1$, such effects as noises, level changes and transients do not effect the measured result. Also for connections b where $L_1$ and $L_0$ transmit in opposite directions, these effects tend to subtract. Additional readings may be taken at other values of frequency as in the method of Fig. 1.

Modifications may be made in the embodiments above disclosed without departing from the spirit of the invention, the scope of which is indicated in the appended claims.

What is claimed is:

1. The method of determining the envelope delay of a transducer between a first and a second station which comprises the steps of transmitting from the first station to the second station a first modulated wave produced by modulating a wave of a first frequency with a wave of a second frequency, detecting said first modulated wave at said second station to obtain a wave of the second frequency, comparing the phase of said detected wave with a wave of said second frequency, transmitting from the second station to the first station a second modulated wave produced by modulating a wave of said first frequency with a wave of said second frequency of known phase relationship with respect to the wave of said second frequency used in making said comparison, detecting said second modulated wave to produce a resultant wave of said second frequency, comparing the phase of said second detected wave with a wave of said second frequency having a known phase relationship with respect to that wave employed to modulate the wave of said first frequency to produce said first modulated wave, and utilizing said phase comparisons to determine the envelope delay of said transducer.

2. The method of determining the envelope delay of a transducer capable of transmitting waves in either direction between a first and a second station which comprises the steps of transmitting from the first station to the second station over the transducer a first modulated wave produced by modulating a wave of a first frequency with a wave of a second frequency, detecting said first modulated wave at said second station to obtain a wave of the second frequency, comparing the phase of said detected wave with a wave of said second frequency, transmitting from the second station to the first station a second modulated wave produced by modulating a wave of said first frequency with a wave of said second frequency of known phase relationship with respect to the wave of said second frequency used in making said comparison, detecting said second modulated wave to produce a resultant wave of said second frequency, comparing the phase of said second detected wave with a wave of said second frequency having a known phase relationship with respect to that wave employed to modulate the wave of said first frequency to produce said first modulated wave, and utilizing said phase comparisons to determine the envelope delay of said transducer.

3. The method of determining the envelope delay of a transducer between a first and a second station which comprises the steps of transmitting from the first station to the second station over the transducer a first modulated wave produced by modulating a wave of a first frequency with a wave of a second frequency, detecting the said first modulated wave at said second station to form a wave of the second frequency, comparing the phase of said detected wave with that of an unmodulated wave of the second frequency generated at said second station, said last-mentioned wave of the second frequency having a known phase relationship with respect to the wave of said second frequency used in making said comparison, transmitting from the second station to the first station over the transducer a second modulated wave produced by modulating a wave of said first frequency with a wave of said second frequency, detecting the second modulated wave to produce a wave of said second frequency, comparing the phase of said second detected wave with that of an unmodulated wave of the second frequency generated at the first station which has a known phase relationship with respect to the wave of said second frequency employed to modulate the wave of said first frequency to produce said first modulated wave, and utilizing said phase comparisons to determine the envelope delay of said transducer.

4. The method of determining the envelope delay of a line capable of transmitting waves in either direction between a first and second station comprising the steps of transmitting from the first station to the second station over said line a first modulated wave produced by modulating a wave of a first frequency with a wave of a second frequency, detecting said first modulated wave at said second station to form a wave of the second frequency, transmitting from the second station to the first station over said line a second modulated wave produced by modulating a wave of the first frequency with a wave of said second frequency, detecting at said first station said second modulated wave to produce a wave of the second frequency, comparing the phases of said two detected waves respectively with waves of said second frequency generated locally at the stations at which the modulated waves are detected and having known phase relationships, respectively, with the waves of said second frequency employed to modulate the respective waves of said first frequency to produce said two modulated waves, and utilizing said two phase comparisons to determine the envelope delay of said transducer.

5. The method of determining the envelope delay of a transducer between a first and a second station which comprises the step of taking a series of readings each for a different measuring frequency, each reading comprising the steps of transmitting from the first station to the second station over the transducer a first modulated wave produced by modulating a wave of the measuring frequency with a wave of a fixed frequency, detecting said modulated wave at the second station to obtain a wave of the fixed frequency, comparing the phase of said detected wave with a wave of said fixed frequency, transmitting from the second station to the first station over the transducer a second modulated wave produced by modulated a wave of said measuring frequency with a wave of said fixed frequency of known phase relationship with respect to the wave of said fixed frequency used in making said comparison, detecting said second modulated wave to produce a resultant wave of said fixed frequency, comparing the phase of said last-mentioned detected wave with a wave of said fixed frequency having a known phase relationship with respect to that wave employed to modulate the wave of said measuring frequency to produce said first modulated wave, and utilizing said phase comparisons to determine the envelope delay of said transducer for the value of measuring frequency used, the fixed frequency being held constant throughout all of the readings.

6. The method of determining the envelope delay of an irreversible line between a first and a second station which comprises the steps of transmitting from the first station to the second station over an auxiliary reversible line a first modulated wave produced by modulating a wave of a first frequency with a wave of a second frequency, detecting said first modulated wave at said second station to obtain a wave of the second frequency, comparing the phase of said detected wave at said second station with that of a wave of said second frequency generated at said second station, transmitting from the second station to the first station over the reversible auxiliary line a second modulated wave produced by modulating a wave of said first frequency with a wave of said second frequency, detecting said second modulated wave at said first station to produce a detected wave of said second frequency, comparing the phase of the second detected wave with that of a wave of the second frequency generated at said first station, transmitting over the irreversible line from the first station to the second station a third modulated wave produced by modulating the wave of the first frequency with a wave of the second frequency at the first station, detecting said third modulated wave to produce a resultant wave of said second frequency, comparing the phase of said third detected wave with that of a wave of said second frequency generated at said second station, transmitting over the reversible line in a direction opposite to the transmission over the irreversible line from the second station to the first station a fourth modulated wave produced by modulating the wave of the first frequency with a wave of the second frequency at the second station, detecting said fourth modulated wave to produce a resultant wave of said second frequency, comparing the phase of said fourth detected wave with that of a wave of said second freqeuncy generated at said first station, and utilizing all of said phase comparisons to determine the envelope delay of said irreversible line.

MONTAGUE S. BURGESS.